(12) United States Patent
Boehm et al.

(10) Patent No.: US 12,530,448 B2
(45) Date of Patent: Jan. 20, 2026

(54) MEASURING CHANGE IN A CHANNEL CHARACTERISTIC TO DETECT MEMORY DEVICE ATTACK

(71) Applicant: Micron Technology, Inc., Boise, ID (US)

(72) Inventors: Aaron Boehm, Boise, ID (US); Jeremy Chritz, Seattle, WA (US); Tamara Schmitz, Scotts Valley, CA (US); David Hulton, Seattle, WA (US); Max Vohra, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 695 days.

(21) Appl. No.: 17/459,543

(22) Filed: Aug. 27, 2021

(65) Prior Publication Data

US 2023/0063890 A1    Mar. 2, 2023

(51) Int. Cl.
*G06F 21/00*   (2013.01)
*G06F 3/06*    (2006.01)
*G06F 21/55*   (2013.01)

(52) U.S. Cl.
CPC .......... *G06F 21/554* (2013.01); *G06F 3/0622* (2013.01); *G06F 3/0632* (2013.01); *G06F 3/0653* (2013.01); *G06F 3/0673* (2013.01); *G06F 2221/034* (2013.01)

(58) Field of Classification Search
CPC ............. G06F 2221/034; G06F 3/0673; G06F 3/0653; G06F 3/0632; G06F 3/0622; G06F 21/554; G06F 21/00; G06F 21/60; H04L 63/14; H04W 12/002; H04W 12/004

USPC .......................................................... 726/23
See application file for complete search history.

(56) References Cited

U.S. PATENT DOCUMENTS

| 8,458,804 | B1 * | 6/2013 | Hyde ..................... G11C 5/005 726/26 |
| 2012/0191964 | A1 * | 7/2012 | Lee ..................... G06F 11/2289 713/2 |
| 2013/0073795 | A1 * | 3/2013 | Hasegawa ........... G06F 12/0238 711/E12.008 |
| 2014/0177370 | A1 * | 6/2014 | Halbert ............. G11C 11/40611 365/222 |
| 2015/0161388 | A1 * | 6/2015 | Margalit ................. G06F 21/79 726/23 |
| 2020/0081631 | A1 * | 3/2020 | Schaefer ............... G06F 3/0629 |
| 2021/0264999 | A1 * | 8/2021 | Bains ....................... G11C 7/24 |

(Continued)

*Primary Examiner* — Josnel Jeudy
(74) *Attorney, Agent, or Firm* — Holland & Hart LLP

(57) ABSTRACT

Methods, systems, and devices for measuring change in a channel characteristic to detect a memory device attack are described. A system, such as a vehicle system, may include a host device coupled with a memory device. The host device may transmit a first signal to the memory device and may receive, from the memory device, a second signal as feedback based on the first signal. The host device may determine a channel characteristic, such as a channel impedance measurement, based on the second signal received from the memory device. If the determined channel characteristic fails to satisfy a threshold (e.g., if the measured channel impedance fails to satisfy a reference value within a tolerance range), the host device may detect a potential attack on the memory device and may take corrective action, such as disabling one or more features of the memory device.

30 Claims, 7 Drawing Sheets

(56) References Cited

U.S. PATENT DOCUMENTS

2021/0390179 A1* 12/2021 Hahn ..................... G06F 21/71
2025/0258737 A1* 8/2025 Richter ............... G06F 11/1068

* cited by examiner

MEASURING CHANGE IN A CHANNEL CHARACTERISTIC TO DETECT MEMORY DEVICE ATTACK

FIELD OF TECHNOLOGY

The following relates generally to one or more systems for memory and more specifically to measuring change in a channel characteristic to detect a memory device attack.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
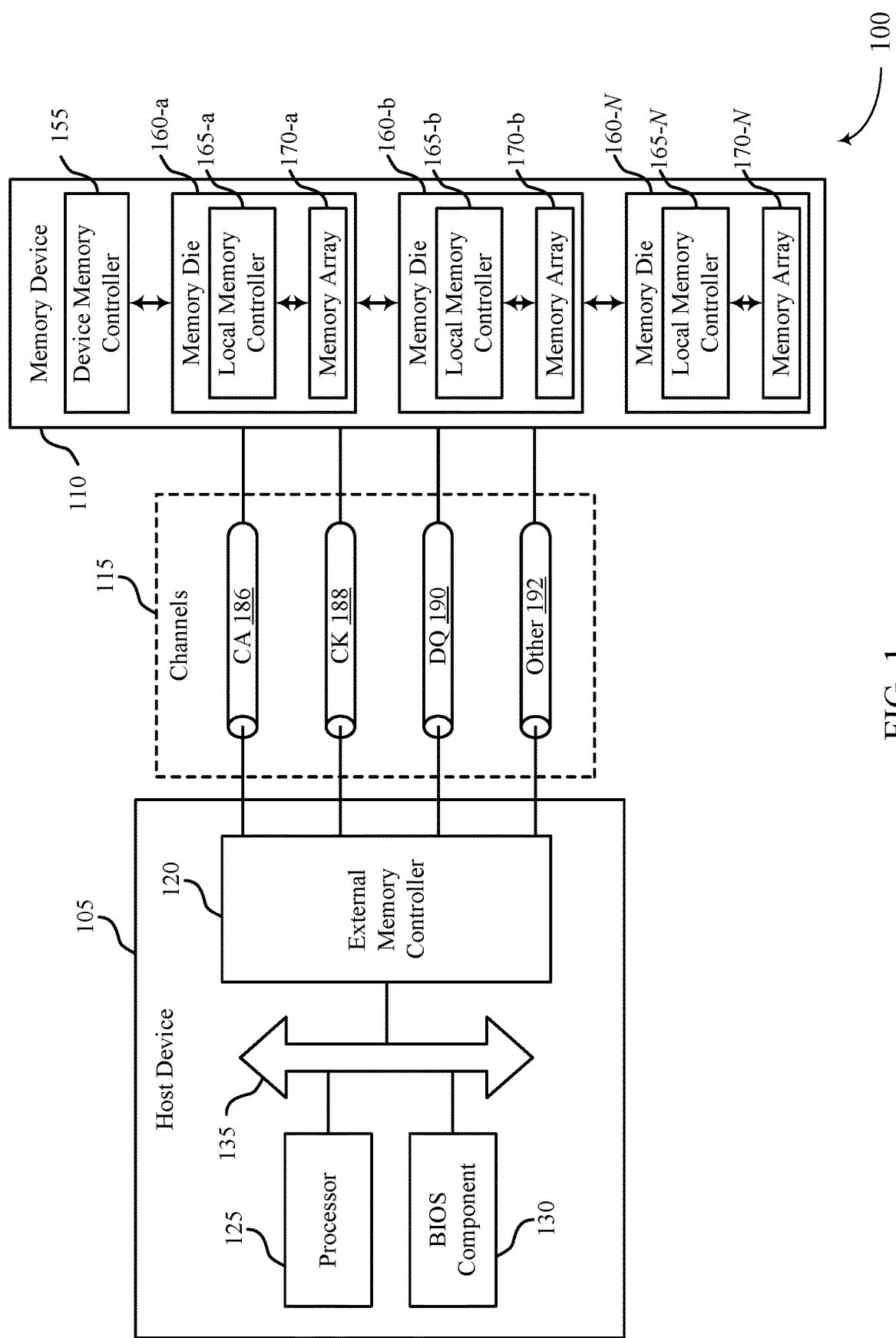
FIGS. 1 and 2 illustrate examples of systems that support measuring change in a channel characteristic to detect a memory device attack in accordance with examples as disclosed herein.

A system, such as an automotive system (e.g., a vehicle), may include a host device coupled with a memory device. The host device and memory device may communicate information (e.g., commands, data) using signaling over one or more channels between the host device and the memory device. In some cases, an attack on the memory device may affect one or more channel characteristics between the memory device and the host device. For example, modifying a printed circuit board (PCB) at the memory device (e.g., by adding an interposer, modifying cabling, modifying a socket, or some combination thereof) may change a characteristic of a channel between the memory device and the host device. Additionally or alternatively, removing the memory device or a component of the memory device (e.g., a dynamic random access memory (DRAM)) from the system may change a characteristic of the channel between the host device and the memory device or the component of the memory device. In some examples, an unauthorized user (e.g., a hacker, a customer) may remove the DRAM or otherwise modify the memory device to capture secure communications or read secure information, among other examples, from the DRAM. Detecting such an attack may allow the memory device to perform operations to mitigate the theft of secure or other information and prevent future theft of secure or other information.

As described herein, a system may support one or more techniques for measuring change in a channel characteristic to detect a memory device attack. To support detection of memory device attacks, a host device of the system may transmit a first signal to the memory device of the system. The memory device may feedback a second signal to the host device based on or in response to the first signal. The feedback may be sent over a specific channel of the set of channels between the host device and the memory device. The host device may determine a channel characteristic based on the second signal received from the memory device. Some example channel characteristics that may indicate a potential memory device attack may include a channel impedance, a signaling amplitude, a phase, a slew rate, a duty cycle, or any combination thereof. The host device may determine whether to disable one or more features of the memory device based on the channel characteristic (e.g., based on a change of the channel characteristic). For example, if the measured channel characteristic fails to satisfy a threshold (e.g., fails to match a reference channel characteristic within an error threshold), the host device may determine that one or more channel conditions have changed and that the memory device has potentially been modified (e.g., as part of an attack). As such, the host device may take one or more corrective actions, such as disabling one or more features of the memory device based on or in response to detecting the change in the channel characteristic. By taking corrective action, such as disabling the one or more features, the memory device may effectively lock or limit specific functionality to protect secure information against attack (e.g., by refraining from using security keys, locking access to specific data, refraining from communicating specific data, or otherwise locking functionality that involves potential security risks).

Features of the disclosure are initially described in the context of systems as described with reference to FIGS. 1 and 2. Features of the disclosure are further described in the context of a process flow as described with reference to FIG. 3. These and other features of the disclosure are further illustrated by and described with reference to apparatus diagrams and flowcharts that relate to measuring change in a channel characteristic to detect a memory device attack as described with reference to FIGS. 4 through 7.

FIG. 1 illustrates an example of a system 100 that supports measuring change in a channel characteristic to detect a memory device attack in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a user device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a user device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, an input component may include a user interface or component with or between other devices. In some examples, an input component may be a peripheral that communicates with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that communicates with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 (e.g., memory die 160-$a$, memory die 160-$b$, memory die 160-N) may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some examples, the system 100 may be an example of an automotive system (e.g., a vehicle). For example, the host device 105 and the memory device 110 may both be components of a vehicle, and the host device 105, the memory device 110, or both may be further coupled with other components of the vehicle. In some cases, a system 100 may be susceptible to attacks from hackers or other users. For example, a user (e.g., a hacker) may probe a memory device 110, such as a DRAM bus or another type of memory device or component, to determine information from the memory device 110. In this way, the user may gain access to secure information or components (e.g., firmware, keys, plaintext data) of the memory device 110 that is intended to be hidden from or inaccessible to the user. Secure information may be information stored at a device (e.g., a vehicle) or information communicated in an ecosystem (e.g., between the vehicle and other devices or cloud components). In some cases, a user may manipulate information at the vehicle or communication information to trigger specific responses, access specific data, or cause other responses at the memory device 110. Secure information may be especially susceptible while a memory device 110 is in an idle state (e.g., operating in a relatively low power mode), which may occur in some vehicle situations, such as when the vehicle is idle for a given duration. Some memory devices 110, such as low-power double data rate (LPDDR) DRAM memory devices, may remain in an idle state for significant periods of time (e.g., days, weeks), during which a user (e.g., a hacker) may attempt to retrieve information (e.g., information that should be otherwise restricted from the user) from the memory device 110. Some vehicle systems may utilize LPDDR DRAM memory for improved power efficiency, but the LPDDR DRAM memory may be potentially susceptible to attacks while the vehicle is parked.

A user (e.g., a hacker) may perform one or more different types of attacks to try to access secure information at a memory device 110. In a first example, the user may physically remove the memory device 110 or a portion of the memory device 110 from the system 100 (e.g., from the vehicle). For example, while the vehicle is turned off and the memory device 110 is in an idle state, the user may remove the memory device 110 and probe the memory device 110 for information (e.g., by detecting information on a DRAM or bus, by putting the memory device 110 into a reader to read out information, or using some other technique). In some cases, the user may remove the DRAM component (e.g., from or as part of a PCB) at the memory device 110, may install an interposer with a breakout cable, and may capture DRAM traffic using a protocol analyzer. In some other cases, the user may freeze the DRAM, other memory device components, or both (e.g., using a substance to supercool the memory device 110 relatively quickly), then remove the cooled memory device 110, and probe the removed memory device 110. For example, the user may remove the DRAM ball grid array (BGA) component from the PCB, solder down the DRAM socket, and install a different DRAM in the socket. This different DRAM may be programmed with data during operation of the vehicle. After the memory device enters a lower power mode such as a sleep mode (e.g., persisting data in RAM), the user may supercool the DRAM (e.g., with freeze spray) and remove the cooled DRAM. Supercooling the DRAM may cause the array to retain at least some data without performing a refresh operation for a significant period of time. The user may place the removed DRAM in another socket board that may be unlocked or have additional test equipment to read the contents of the array, searching for keys to decrypt the secure storage. The user may capture a significant quantity of information (e.g., terabytes of data) over a period of time (e.g., one or more days) while the memory device 110 is removed using one or more of these techniques.

In a second example, a user may probe the memory device 110 while the memory device 110 is in place within the system 100 (e.g., without removing the memory device 110 or a portion of the memory device 110 from the vehicle). For example, if a vehicle remains idle (e.g., parked) for a significant time period (e.g., multiple days or weeks), the user may probe the memory device 110 in place over the course of a few days or a longer duration. Similar to the first example, the user may capture a significant quantity of information (e.g., terabytes of data) over a period of time (e.g., one or more days) without removing the memory device 110 from the system 100.

In a third example, a user may install a third-party device within the system 100 (e.g., on a vehicle, for example, without the knowledge of the vehicle's owner). The third-party device may read or gather information from the memory device 110 and may transmit the information back to the user (e.g., in real-time or according to some periodicity or trigger condition). In some cases, the added third-party device may read information while the vehicle is in operation. For example, the third-party device may use a DRAM logic analyzer or another component to perform channel analysis on the memory device 110, the host device 105, or both. The third-party device may capture and transmit information to the user while the vehicle is parked, while the vehicle is operating, or a combination thereof.

As described herein, if a memory device 110 or a portion of a memory device 110 is removed from the system 100 or if the memory device 110 is modified independent of the original equipment manufacturer (OEM), channel conditions for one or more channels 115 may change. Accordingly, the system 100 may detect one or more types of attacks on the memory device 110 based on detecting a change in a channel characteristic for a channel 115. To support such detection, the host device 105 may transmit a first signal to the memory device 110. The memory device 110 may feedback a second signal to the host device 105 based on or in response to the first signal. The feedback may be sent over a specific channel 115 of the set of channels 115 between the host device 105 and the memory device 110. The host device 105 may determine a channel characteristic based on the second signal received from the memory device 110 and may determine whether to take corrective action, such as disabling one or more features of the memory device 110 based on the channel characteristic. For example, if the measured channel characteristic fails to satisfy a threshold (e.g., fails to match a reference channel characteristic within an error threshold), the host device 105 may determine that one or more channel conditions have changed and that the memory device 110 has potentially been removed or modified as part of an attack on the memory device 110. As such, the memory device 110 may take corrective action, such as disabling one or more features (e.g., lock specific functionality to protect secure information against attack) in response to the host device 105 detecting the change in a channel characteristic.

Though some examples may be described herein in terms of DRAM, ferroelectric RAM (FeRAM), or other capacitive-based memory types, it is to be understood that aspects of the teachings herein may be applied to any memory device (e.g., various types and combinations of volatile memory, non-volatile memory, or some combinations of both). Additionally, although some examples may be described herein in terms of vehicles and automotive systems, it is to be understood that the teachings herein may be applied to any system and various examples outside of the vehicle context, which is merely one example implementation.

Figure 2:
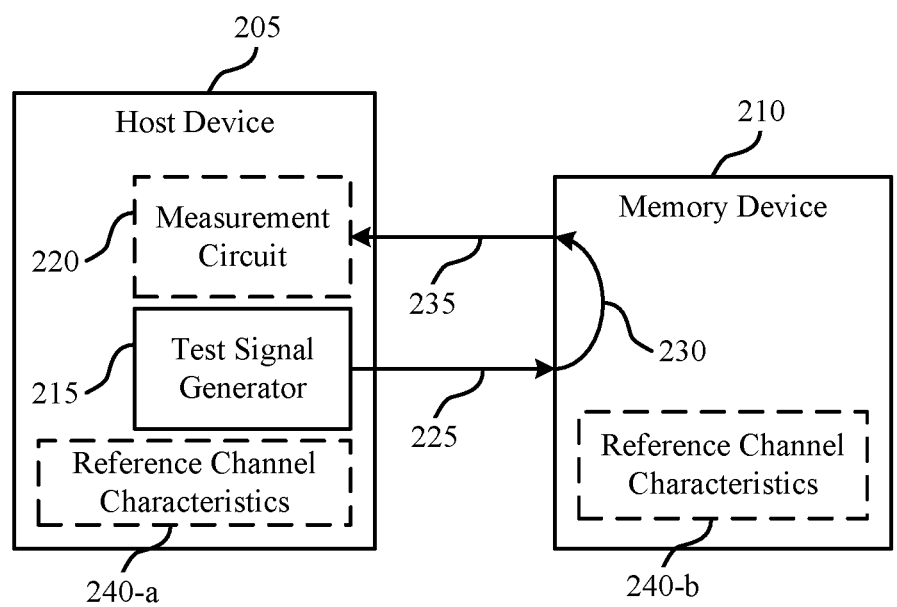

FIG. 2 illustrates an example of a system 200 that supports measuring change in a channel characteristic to detect a memory device attack in accordance with examples as disclosed herein. The system 200 may be an example of a system 100 as described with reference to FIG. 1. For example, the system 200 may be an example of an automotive system, such as a vehicle. The system 200 may include a host device 205 and a memory device 210, which may be examples of the corresponding devices described with reference to FIG. 1. The host device 205 may be coupled with the memory device 210, such that the host device 205 may issue signals to and receive signals from the memory device 210 over one or more channels, such as the channels 115 described with reference to FIG. 1. The host device 205 may use a channel characteristic determined using signaling between the host device 205 and the memory device 210 to detect attacks on the memory device 210.

In some cases, an attack on the memory device 210 may affect one or more channel characteristics between the memory device 210 and the host device 205. For example, modifying a PCB at the memory device 210 (e.g., by adding an interposer, modifying cabling, modifying a socket, or some combination thereof) may change a characteristic of the channel between the memory device 210 and the host device 205. Additionally or alternatively, removing the memory device 210 or a component of the memory device 210 (e.g., a DRAM) from the system 200 may change a characteristic of the channel. Some example channel characteristics that may be affected by an attack on the memory device 210 may include a channel impedance, a signaling amplitude, a phase, a slew rate, a duty cycle, or any combination thereof for signaling over the channel. If the host device 205 detects a change in a channel characteristic, the host device 205 may determine that the memory device 210 has potentially been modified, for example, as part of an attack on the memory device 210.

To support detection of a change to a channel characteristic, the memory device 210, the host device 205, or both may store one or more reference channel characteristics for a channel between the host device 205 and the memory device 210. To measure a reference channel characteristic, the host device 205 may transmit a first signal 225 to the memory device 210 and receive a second signal 235 as feedback based on a feedback procedure 230 at the memory device 210. The host device 205 may measure the reference channel characteristic based on one or more properties of the received second signal 235, the memory device 210 may measure a reference channel characteristic based on one or more properties of the first signal 225, or both. In some cases, the reference channel characteristic may be measured multiple times to obtain an average value. The one or more reference channel characteristics may be measured after assembly of the memory device 210 (e.g., after final board assembly at the integrator), such that the reference channel characteristics correspond to post-assembly values. In some examples, the memory device 210, the host device 205, or both may measure and store multiple reference channel characteristic values at different conditions (e.g., at different frequencies, voltages, temperatures, or the like). For example, the channel conditions between the host device 205 and the memory device 210 may be tested multiple times in different environments with different operating conditions based on a granularity or accuracy for the reference measurements. Accordingly, the system 200 may support using a reference channel characteristic specific to the current operating conditions (e.g., given the granularity of the stored reference channel characteristics) to test if channel conditions have changed.

The memory device 210, the host device 205, or both may write the one or more reference channel characteristics in non-volatile memory. For example, the host device 205 may write (e.g., program) the one or more reference channel characteristics 240-*a* to non-volatile memory at the host device 205, the memory device 210 may write (e.g., program) the one or more reference channel characteristics 240-*b* to non-volatile memory at the memory device 210, or both. The memory device 210 may write the one or more reference channel characteristics 240-*b* to non-volatile memory separate from a DRAM component of the memory device 210, such that if the DRAM component is modified or removed as part of an attack on the memory device 210, the memory device 210 may retain the one or more reference channel characteristics 240-*b* to support detecting the attack. In some examples, the host device 205, the memory device 210, or both may additionally log the respective operating conditions corresponding to each reference channel characteristic to the non-volatile memory, such that the host device 205, the memory device 210, or both may look up a relevant reference channel characteristic based on the current operating conditions.

The host device 205 may use test signaling and the one or more reference channel characteristics 240 to detect a potential attack on the memory device 210. For example, the host device 205 may generate a test signal (e.g., a first signal 225) using a test signal generator 215. The test signal generator 215 may be an example of any type of signal generator, where the signal generator may include an oscillator, a microprocessor, or any combination of these or other components. The test signal generator 215 may generate a first signal 225 (e.g., a sinusoidal test signal) using specific signal parameters. For example, the test signal generator 215 may vary a frequency of the first signal 225, an amplitude of the first signal 225, a voltage of the first signal 225, or any combination thereof based on one or more selection parameters (e.g., based on current operating conditions, one or more channel metrics, a user input, or any other parameters). In some examples, the test signal generator 215 may utilize clocking architecture at the host device 205. In some other examples, the test signal generator 215 may utilize a specialized circuit for performing the test for detecting memory device attack. In some cases, the test signal generator 215 may send the first signal 225 to the memory device 210 on a data clock pin. In some other cases, the test signal generator 215 may use a different pin for the test signal. In some examples, the test signal generator 215 and the memory device 210 may both be configured for bidirectional communication (e.g., communication from the test signal generator 215 to the memory device 210 and communication from the memory device 210 to the test signal generator 215).

The memory device 210 may receive the test signal (e.g., the first signal 225) from the host device 205. The memory device 210 may include or be an example of a DRAM component. The memory device 210 may support a method for feeding back the test signal to the host device 205 on a pin. For example, the memory device 210 may feedback the test signal (e.g., as a second signal 235) on a data pin. In some other examples, the memory device 210 may feedback the test signal (e.g., as the second signal 235) using a different pin. Accordingly, the first signal 225 and the second signal 235 may correspond to a same roundtrip signal from the host device 205 to the memory device 210 and back to the host device 205. The memory device 210 may support the feedback procedure 230 using internal logic, specialized circuitry, or a combination thereof. In some examples, the memory device 210 may support a first mode (e.g., a feedback mode) in which the memory device 210 is configured to automatically feedback the test signal. For example, upon entering a power on state, the memory device 210 may operate according to the first mode (e.g., a default mode upon powering on) that supports the feedback procedure 230 for the test signal, where the memory device 210 transmits the second signal 235 that includes feedback for the first signal 225 based on operating in the first mode.

The host device 205 may determine a channel characteristic based on the received second signal 235. For example, the host device 205 may support a feature for measuring one or more channel characteristics based on a roundtrip signal. For example, the host device may include a measurement circuit 220 that may support measuring a channel impedance, a signaling amplitude, a phase, a slew rate, a duty cycle, one or more other conditions or characteristics, or any combination thereof. As an example, the host device 205 may include a measurement circuit, which may be or include an impedance measurement circuit 220 that may measure the channel impedance between the host device 205 and the memory device 210 based on the roundtrip signal (e.g., based on the second signal 235 received as feedback for the first signal 225). Additionally or alternatively, the host device 205 may determine other channel characteristics of a channel between the host device 205 and the memory device 210. In some examples, the impedance measurement circuit 220 and the memory device 210 may both be configured for bidirectional communication (e.g., communication from the impedance measurement circuit 220 to the memory device 210 and communication from the memory device 210 to the impedance measurement circuit 220).

The host device 205 may use the determined channel characteristic to detect whether channel conditions have changed. For example, as described herein, a change to the channel conditions may indicate a modification to the memory device 210, which may occur as part of an attack on the memory device 210. In some examples, a switch at the host device 205 may activate or deactivate based on the determined channel characteristic (e.g., based on a signal strength or voltage of the second signal 235 satisfying a threshold). Activating or deactivating the switch may indicate a change to the channel. In some other examples, the host device 205 may compare the determined channel characteristic to a threshold (e.g., a threshold value or a threshold range). The threshold may be based on one or more reference channel characteristics 240 stored at the host device 205, the memory device 210, or both. For example, the host device 205 may read a reference channel characteristic from non-volatile memory or receive a signal indicative of a reference channel characteristic from the memory device 210. In some examples, the host device 205 may receive validation of the reference channel characteristic from an external device or system (e.g., from cloud resources). If multiple reference channel characteristics are stored for different data points (e.g., corresponding to different respective operating parameters), the host device 205 may determine one or more current operating parameters and may select the reference channel characteristic corresponding to the one or more current operating parameters. For example, the host device 205 may determine a current temperature (e.g., a first temperature at which the first signal 225 is transmitted, a second temperature at which the second signal 235 is received, or some combination thereof), a frequency, amplitude, or voltage used for the test signal, or any combination of these or other operating parameters to select the relevant reference channel characteristic.

The host device 205 may use the reference channel characteristic to determine the threshold in some examples. In some cases, the host device 205 may determine a threshold range using the reference channel characteristic and an acceptable error threshold for the channel characteristic. If the determined channel characteristic falls within the threshold range, the host device 205 may determine that the channel characteristic is appropriate (e.g., within an acceptable tolerance, approximately the same) as the reference channel characteristic and the host device 205 and the memory device 210 may operate as normal. If the determined channel characteristic falls outside of the threshold range, the host device 205 may determine that the channel characteristic is relatively different than the reference channel characteristic and, correspondingly, that the channel has changed.

If the host device 205 detects that a channel characteristic has changed (e.g., from the reference channel characteristic), the host device 205 may initiate one or more corrective actions, including those that may be performed by the host device 205, or the memory device 210, or some combination. For example, the host device 205 may disable one or more features of the memory device 210. For example, the host device 205 may lock specific functionality at the memory device 210, the host device 205, or both. In some examples, the host device 205 may transmit a signal indicative of a command to the memory device 210 to disable one or more features of the memory device 210. In some cases, the memory device 210 may disable (e.g., lock) functionality with security sensitivities (e.g., keys, unencrypted data)

and may continue to support functionality that does not include such security sensitivities. In some cases, the host device 205 and the memory device 210 may continue to support some functionality, for example, to support a vehicle turning on and driving to a dealer for repairs. Additionally or alternatively, the host device 205 may trigger sending a report to the OEM or a user device (e.g., a user device operated by the owner of the vehicle) to indicate the detected memory device attack, the disabling of functionality, or both. In some cases, the vehicle may send the report (e.g., a signal indicative of a notification) using vehicle-to-everything (V2X) communications.

Disabling the one or more features of the memory device 210 may provide additional security for the memory device 210. For example, by disabling the one or more features, the host device 205 and the memory device 210 may refrain from communicating sensitive information or secure information that may be compromised due to a modification to the memory device 210. Additionally or alternatively, the memory device 210 may lock some access operations (e.g., for DRAM), such that keys, unencrypted data, and other information may not be read from the memory device 210. Accordingly, the system 200 may detect a potential attack on the memory device 210 and perform operations to mitigate any potential data loss or security breach due to the attack.

The host device 205 may perform the test to check for a memory device attack according to a periodicity, one or more modes, one or more trigger conditions, or some combination thereof. In some examples, the host device 205 may perform a health monitoring procedure for the memory device 210. As part of monitoring the health of the memory device 210, the host device 205 may transmit the first signal 225 to the memory device 210 to detect whether a channel characteristic has changed. Accordingly, the host device 205 may perform the test signaling and channel characteristic measurement for diagnostics as part of the health monitoring procedure. For example, a change in the channel may indicate a memory device attack or another health issue (e.g., a bad soldering joint). In some cases, based on the channel characteristic, the host device 205 may predict whether the change in channel conditions corresponds to a health issue at the memory device 210 or an attack on the memory device 210 (e.g., using different thresholds, different threshold ranges, different channel characteristics, or some combination thereof). In some cases, the host device 205 may trigger sending a warning to a user indicating for the user to bring the vehicle in for a checkup (e.g., if a health issue is detected for the memory device 210).

In some other examples, the host device 205 may transmit the first signal 225 to the memory device 210 during boot time. For example, the host device 205 may perform a procedure for booting up the memory device 210, where transmitting the test signal and determining a channel characteristic (e.g., performing new channel impedance measurements) may be based on performing the procedure for booting up the memory device 210. If the host device 205 detects a memory device attack based on the channel characteristic, the host device 205 may stop the procedure for booting up the memory device and refrain from communicating secure information with the memory device 210 based on stopping the boot up procedure. For example, the host device 205 may use a first security key to perform a first portion of the boot up procedure, where transmitting the test signal involves using the first security key. However, the host device 205 may refrain from using a second security key associated with a second portion of the boot up procedure based on detecting a memory device attack. Refraining from using the second security key may effectively disable one or more features of the memory device 210, for example, by failing to complete the boot up procedure for the memory device 210. Additionally or alternatively, the host device 205 may trigger sending the test signal (e.g., performing the test for a memory device attack) based on a user input, based on the vehicle remaining parked for a threshold time duration, or both.

Figure 3:
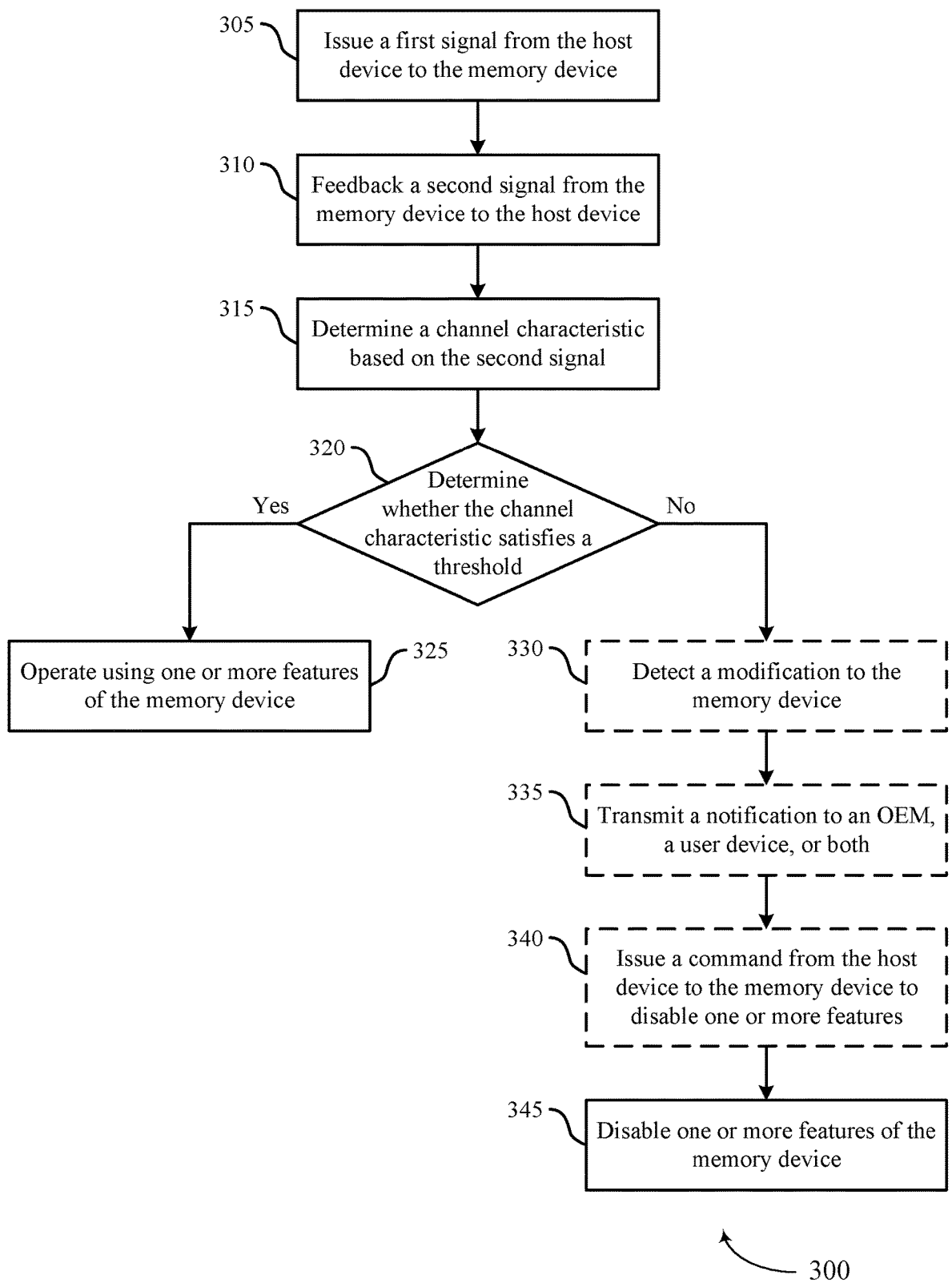
FIG. 3 illustrates an example of a process flow that supports measuring change in a channel characteristic to detect a memory device attack in accordance with examples as disclosed herein.

FIG. 3 illustrates an example of a process flow 300 that supports measuring change in a channel characteristic to detect a memory device attack in accordance with examples as disclosed herein. The process flow 300 may be performed by devices described with reference to FIGS. 1 and 2. For example, a host device—such as a host device 105 or a host device 205—may perform one or more aspects of the process flow 300, and a memory device—such as a memory device 110 or a memory device 210—may perform one or more other aspects of the process flow 300. The host device may be coupled with a memory device, and the host device and memory device may both be associated with (e.g., components of) a vehicle. The process flow 300 may support detection of a memory device attack based on detecting a change to a channel characteristic. Alternative examples of the following may be implemented, where some steps are performed in a different order or not at all. Additionally, some steps may include additional features not mentioned below.

Aspects of the process flow 300 may be implemented by a controller, among other components (e.g., a host device controller, an external memory controller, a device memory controller, or some combination thereof). Additionally or alternatively, aspects of the process flow 300 may be implemented by logic coupled with a host device or a memory device. For example, the logic may be operable to cause an apparatus to perform the operations of the process flow 300.

At 305, the host device may transmit a first signal to the memory device. For example, the first signal may be transmitted using a data clock pin. In some examples, the host device may select at least one of a frequency, an amplitude, a voltage, or a combination thereof for the first signal and may transmit the first signal using the selected one or more parameters. The memory device may receive the first signal from the host device.

At 310, the memory device may transmit, to the host device, a second signal that includes feedback for the first signal. For example, the second signal may be transmitted using a data pin. In some examples, the memory device may include a feedback mechanism (e.g., logic, firmware) that may feedback a signal received on a first pin using a second pin. For example, the memory device may receive a signal (e.g., a first signal) on a data clock pin and may feedback the signal (e.g., a second signal) on a data pin based on the received signal strength, frequency, amplitude, voltage, or any combination thereof. The host device may receive the second signal that includes feedback for the first signal.

At 315, the host device may determine a channel characteristic based on the second signal received from the memory device. In some cases, the channel characteristic may be an example of a channel impedance between the host device and the memory device. In some other cases, the channel characteristic may be an amplitude for the second signal, a phase for the second signal, a slew rate for the second signal, a duty cycle for the second signal, or any combination thereof. The determined channel characteristic may correspond to a reference channel characteristic stored by the host device, the memory device, or both. For example, the stored reference channel characteristic may indicate a value for the channel characteristic corresponding to an unmodified memory device or a memory device that has not been removed from the vehicle.

At 320, the host device may determine whether the channel characteristic satisfies a threshold. That is, the host device may determine whether the channel characteristic has changed, indicating a potential memory device attack. In some examples, the host device may compare the determined channel characteristic to a threshold range (e.g., defined by a threshold and an additional threshold). The threshold range may correspond to a reference channel characteristic, where the threshold range covers a set of values within an error threshold around the reference channel characteristic. Accordingly, the threshold range may correspond to values for the channel characteristic if the channel characteristic is relatively unchanged from the reference channel characteristic, while values outside the threshold range indicate that the channel characteristic has changed relative to the reference channel characteristic.

If the channel characteristic satisfies the threshold (e.g., the channel characteristic falls within the threshold range, indicating negligible change to the channel characteristic), at 325, the memory device may operate in a normal operating mode. For example, the memory device may operate using one or more features that may involve potential security concerns if the memory device was attacked (e.g., removed, modified). The memory device may access secure information and support a full set of operations based on the host device failing to detect a significant change to the channel characteristic.

If the channel characteristic fails to satisfy the threshold (e.g., the channel characteristic falls outside the threshold range), the host device may detect a change to the channel characteristic. In some examples, a change to a channel characteristic may potentially indicate a memory device attack. In some examples, at 330, the host device may detect a modification to the memory device based on the channel characteristic failing to satisfy the threshold. The modification may include adding an interposer to the memory device, adding cabling to the memory device, adding a socket to the memory device, removing a memory component (e.g., the DRAM) from the memory device, or some combination thereof.

In some examples, at 335, the host device may transmit a notification to an OEM for the memory device, a user device, or both. For example, the host device may transmit a signal indicative of the notification based on the channel characteristic failing to satisfy the threshold. The notification may include an alert indicating a potential memory device attack, such that the OEM, a user operating the user device (e.g., the owner of the vehicle), or another system may take precautionary measures in response to the potential memory device attack.

In some examples, at 340, the host device may issue a command to the memory system to disable one or more features of the memory device. For example, the host device may transmit a third signal indicative of the command to the memory device. The command may initiate a locking of a feature of the memory device. That is, the memory device may receive, from the host device, the third signal indicative of the command based on the second signal (e.g., based on the channel characteristic determined from the second signal failing to satisfy the threshold).

At 345, the host device, the memory device, or both may disable one or more features of the memory device, for example, based on the channel characteristic failing to satisfy the threshold. If a signal indicative of a command is received by the memory device at 340, the memory device may disable the one or more features in response to the command. Disabling the one or more features may involve entering a high-security mode, or otherwise refraining from performing one or more operations that may potentially compromise secure information at the memory device. In this way, the host device, the memory device, or both may detect an attack on the memory device based on a change in a channel characteristic and may modify the functionality of the memory device to protect against the detected attack. Such a process flow 300 may improve security at the memory device.

Figure 4:
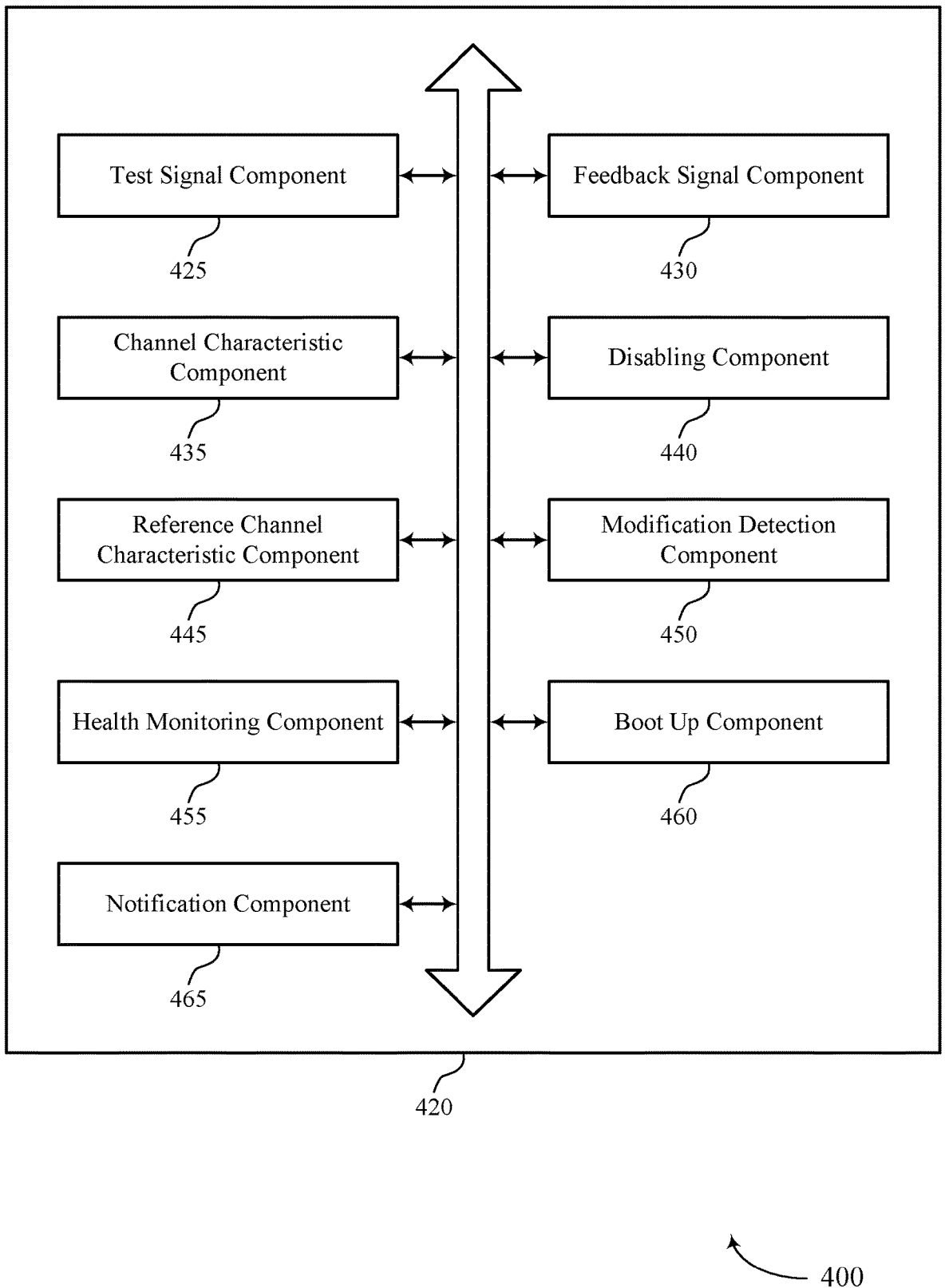
FIG. 4 shows a block diagram of a host device that supports measuring change in a channel characteristic to detect a memory device attack in accordance with examples as disclosed herein.

FIG. 4 shows a block diagram 400 of a host device 420 that supports measuring change in a channel characteristic to detect a memory device attack in accordance with examples as disclosed herein. The host device 420 may be an example of aspects of a host device as described with reference to FIGS. 1 through 3. The host device 420, or various components thereof, may be an example of means for performing various aspects of measuring change in a channel characteristic to detect a memory device attack as described herein. For example, the host device 420 may include a test signal component 425, a feedback signal component 430, a channel characteristic component 435, a disabling component 440, a reference channel characteristic component 445, a modification detection component 450, a health monitoring component 455, a boot up component 460, a notification component 465, or any combination thereof. Each of these components may communicate, directly or indirectly, with one another (e.g., via one or more buses).

The test signal component 425 may be configured as or otherwise support a means for transmitting a first signal to a memory device. The feedback signal component 430 may be configured as or otherwise support a means for receiving, from the memory device, a second signal that includes feedback for the first signal. The channel characteristic component 435 may be configured as or otherwise support a means for determining a channel characteristic based at least in part on the second signal from the memory device. The disabling component 440 may be configured as or otherwise support a means for disabling one or more features of the memory device based at least in part on the channel characteristic failing to satisfy a threshold.

In some examples, the reference channel characteristic component 445 may be configured as or otherwise support a means for comparing the channel characteristic to the threshold and an additional threshold, where the threshold and the additional threshold define a threshold range corresponding to a reference channel characteristic, and where disabling the one or more features of the memory device is based at least in part on the channel characteristic failing to satisfy the threshold range.

In some examples, the reference channel characteristic component 445 may be configured as or otherwise support a means for writing the reference channel characteristic to non-volatile memory at the memory device, or a host device (e.g., the host device 420), or both. In some examples, the reference channel characteristic component 445 may be configured as or otherwise support a means for determining the threshold and the additional threshold defining the threshold range based at least in part on reading the reference channel characteristic from the non-volatile memory.

In some examples, the reference channel characteristic component 445 may be configured as or otherwise support a means for determining a plurality of reference channel characteristics for a host device (e.g., the host device 420) and the memory device, where each reference channel characteristic of the plurality of reference channel characteristics corresponds to one or more respective operating parameters. In some examples, the reference channel characteristic component 445 may be configured as or otherwise support a means for writing the plurality of reference channel characteristics to non-volatile memory at the memory device, or the host device, or both. In some examples, the reference channel characteristic component 445 may be configured as or otherwise support a means for comparing the channel characteristic to the threshold based at least in part on a reference channel characteristic of the plurality of reference channel characteristics, where the disabling is based at least in part on the comparing.

In some examples, the reference channel characteristic component 445 may be configured as or otherwise support a means for determining a first temperature at which the first signal is transmitted, or a second temperature at which the second signal is received, or both. In some examples, the reference channel characteristic component 445 may be configured as or otherwise support a means for selecting the reference channel characteristic of the plurality of reference channel characteristics for comparing the channel characteristic to the threshold based at least in part on the first temperature, or the second temperature, or both.

In some examples, the modification detection component 450 may be configured as or otherwise support a means for detecting a modification to the memory device based at least in part on the channel characteristic failing to satisfy the threshold, where disabling the one or more features of the memory device is based at least in part on detecting the modification to the memory device. In some examples, the modification to the memory device includes adding an interposer to the memory device, adding cabling to the memory device, adding a socket to the memory device, or removing a DRAM component from the memory device, or any combination thereof.

In some examples, the health monitoring component 455 may be configured as or otherwise support a means for monitoring a health of the memory device, where transmitting the first signal and determining the channel characteristic are based at least in part on monitoring the health of the memory device.

In some examples, the boot up component 460 may be configured as or otherwise support a means for performing a procedure for booting up the memory device, where transmitting the first signal and determining the channel characteristic are based at least in part on performing the procedure for booting up the memory device. In some examples, the boot up component 460 may be configured as or otherwise support a means for stopping the procedure for booting up the memory device based at least in part on the channel characteristic failing to satisfy the threshold. In some examples, the boot up component 460 may be configured as or otherwise support a means for refraining from communicating secure information with the memory device based at least in part on stopping the procedure for booting up the memory device. In some examples, the boot up component 460 may be configured as or otherwise support a means for using a first security key to perform a first portion of the procedure for booting up the memory device, where transmitting the first signal to the memory device is based at least in part on using the first security key. In some examples, the boot up component 460 may be configured as or otherwise support a means for refraining from using a second security key associated with a second portion of the procedure for booting up the memory device based at least in part on the channel characteristic failing to satisfy the threshold, where disabling the one or more features of the memory device is based at least in part on failing to complete the second portion of the procedure for booting up the memory device.

In some examples, the notification component 465 may be configured as or otherwise support a means for transmitting a signal indicative of a notification to an OEM, or a user device, or any combination thereof based at least in part on the channel characteristic failing to satisfy the threshold.

In some examples, the disabling component 440 may be configured as or otherwise support a means for transmitting a third signal indicative of a command to the memory device. In some examples, the disabling component 440 may be configured as or otherwise support a means for initiating a locking of a feature of the memory device based at least in part on the command, where the disabling is based at least in part on initiating the locking of the feature.

In some examples, the test signal component 425 may be configured as or otherwise support a means for selecting at least one of a frequency, an amplitude, or a voltage, or any combination thereof for the first signal, where transmitting the first signal is based at least in part on the selecting.

In some examples, the channel characteristic includes a channel impedance between a host device transmitting the first signal (e.g., the host device 420) and the memory device. In some examples, the channel characteristic includes at least one of an amplitude for the second signal, a phase for the second signal, a slew rate for the second signal, or a duty cycle for the second signal, or any combination thereof.

In some examples, the first signal is transmitted using a data clock pin. In some examples, the second signal is received using a data pin. In some examples, a host device transmitting the first signal (e.g., the host device 420) and the memory device are both associated with a vehicle.

Figure 5:
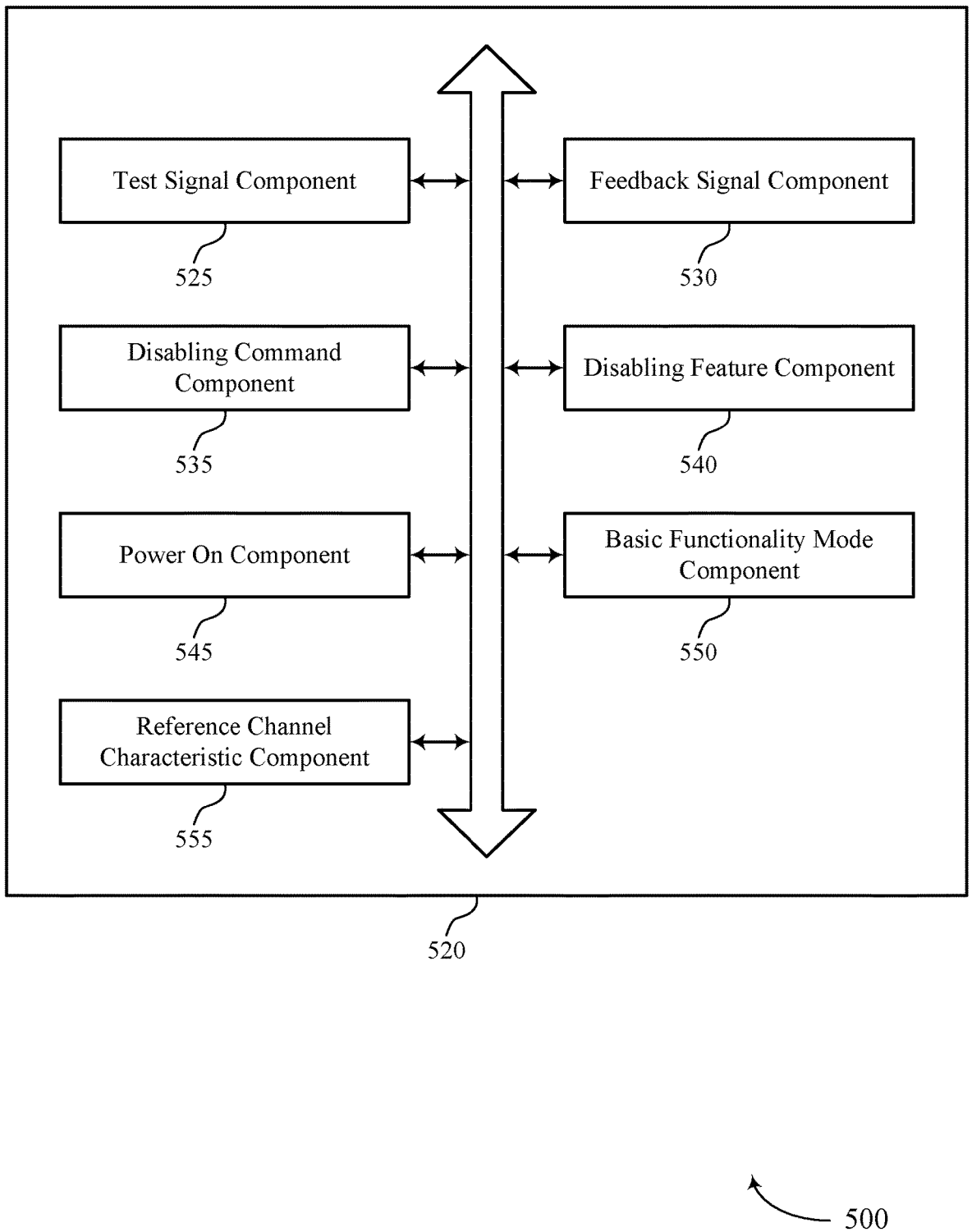
FIG. 5 shows a block diagram of a memory device that supports measuring change in a channel characteristic to detect a memory device attack in accordance with examples as disclosed herein.

FIG. 5 shows a block diagram 500 of a memory device 520 that supports measuring change in a channel characteristic to detect a memory device attack in accordance with examples as disclosed herein. The memory device 520 may be an example of aspects of a memory device as described with reference to FIGS. 1 through 3. The memory device 520, or various components thereof, may be an example of means for performing various aspects of measuring change in a channel characteristic to detect a memory device attack as described herein. For example, the memory device 520 may include a test signal component 525, a feedback signal component 530, a disabling command component 535, a disabling feature component 540, a power on component 545, a basic functionality mode component 550, a reference channel characteristic component 555, or any combination thereof. Each of these components may communicate, directly or indirectly, with one another (e.g., via one or more buses).

The test signal component 525 may be configured as or otherwise support a means for receiving a first signal from a host device. The feedback signal component 530 may be configured as or otherwise support a means for transmitting, to the host device, a second signal that includes feedback for the first signal. The disabling command component 535 may be configured as or otherwise support a means for receiving, from the host device, a third signal indicative of a command based at least in part on transmitting the second signal. The disabling feature component 540 may be configured as or otherwise support a means for disabling one or more features of a memory device (e.g., the memory device 520) based at least in part on the command.

In some examples, the power on component 545 may be configured as or otherwise support a means for entering a power on state, where the first signal is received while operating in the power on state. In some examples, the basic functionality mode component 550 may be configured as or otherwise support a means for operating according to a first mode supporting a feedback procedure for the first signal based at least in part on entering the power on state, where transmitting the second signal is based at least in part on operating according to the first mode supporting the feedback procedure.

In some examples, the reference channel characteristic component 555 may be configured as or otherwise support a means for transmitting a signal indicative of a reference channel characteristic to the host device, where the third signal indicative of the command is received further based at least in part on the reference channel characteristic.

In some examples, the reference channel characteristic component 555 may be configured as or otherwise support a means for writing a plurality of reference channel characteristics to non-volatile memory, where the signal indicative of the reference channel characteristic is transmitted based at least in part on the plurality of reference channel characteristics. In some examples, the plurality of reference channel characteristics is written to the non-volatile memory separate from a DRAM component of the memory device.

In some examples, the first signal is received using a data clock pin. In some examples, the second signal is transmitted using a data pin. In some examples, the host device and the memory device are both associated with a vehicle.

Figure 6:
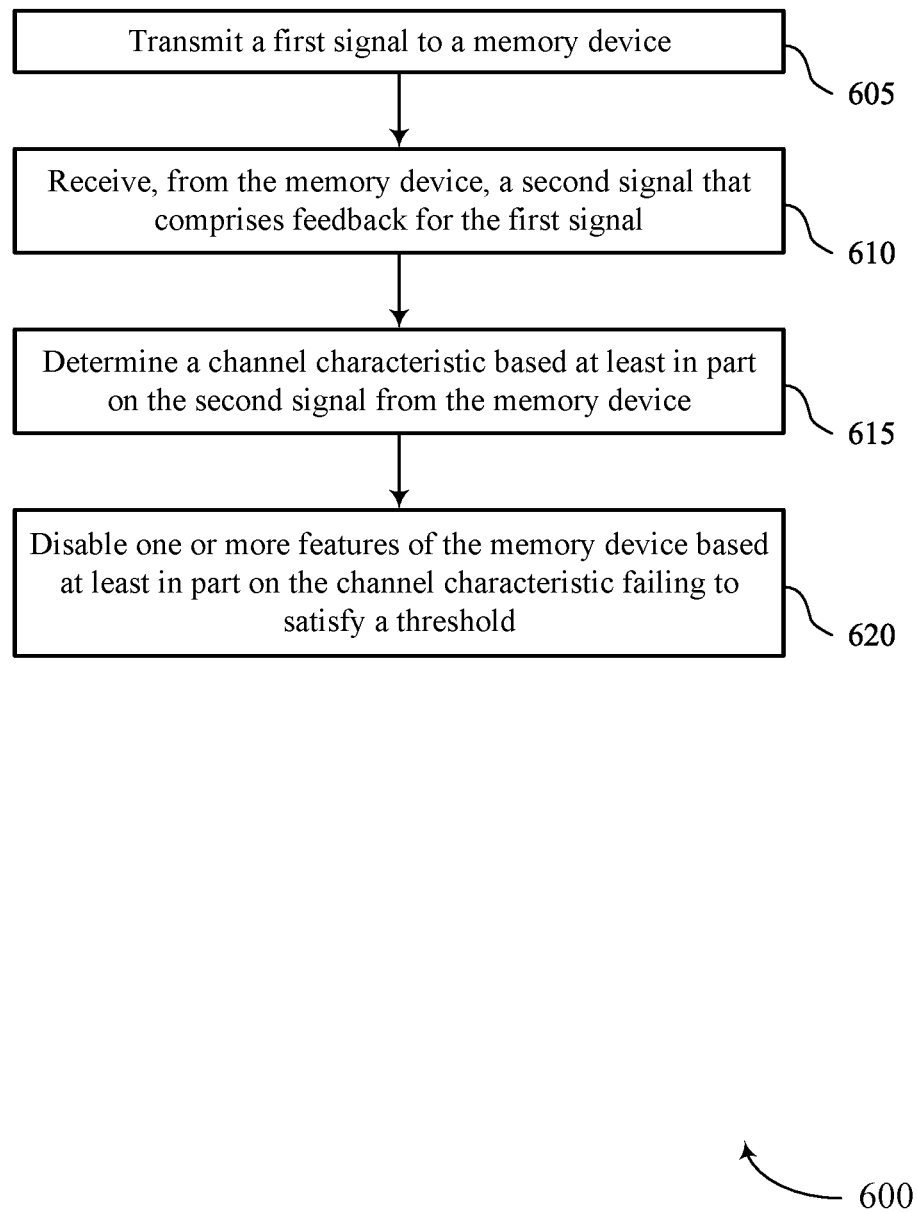
FIGS. 6 and 7 show flowcharts illustrating a method or methods that support measuring change in a channel characteristic to detect a memory device attack in accordance with examples as disclosed herein.

FIG. 6 shows a flowchart illustrating a method 600 that supports measuring change in a channel characteristic to detect a memory device attack in accordance with examples as disclosed herein. The operations of method 600 may be implemented by a host device or its components as described herein. For example, the operations of method 600 may be performed by a host device as described with reference to FIGS. 1 through 4. In some examples, a host device may execute a set of instructions to control the functional elements of the device to perform the described functions. Additionally or alternatively, the host device may perform aspects of the described functions using special-purpose hardware.

At 605, the method may include transmitting a first signal to a memory device. The operations of 605 may be performed in accordance with examples as described with reference to FIGS. 2 and 3. In some examples, aspects of the operations of 605 may be performed by a test signal component 425 as described with reference to FIG. 4.

At 610, the method may include receiving, from the memory device, a second signal that includes feedback for the first signal. The operations of 610 may be performed in accordance with examples as described with reference to FIGS. 2 and 3. In some examples, aspects of the operations of 610 may be performed by a feedback signal component 430 as described with reference to FIG. 4.

At 615, the method may include determining a channel characteristic based at least in part on the second signal from the memory device. The operations of 615 may be performed in accordance with examples as described with reference to FIGS. 2 and 3. In some examples, aspects of the operations of 615 may be performed by a channel characteristic component 435 as described with reference to FIG. 4.

At 620, the method may include disabling one or more features of the memory device based at least in part on the channel characteristic failing to satisfy a threshold. The operations of 620 may be performed in accordance with examples as described with reference to FIGS. 2 and 3. In some examples, aspects of the operations of 620 may be performed by a disabling component 440 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor) for transmitting a first signal to a memory device, receiving, from the memory device, a second signal that includes feedback for the first signal, determining a channel characteristic based at least in part on the second signal from the memory device, and disabling one or more features of the memory device based at least in part on the channel characteristic failing to satisfy a threshold.

Some examples of the method 600 and the apparatus described herein may further include operations, features, circuitry, logic, means, or instructions for comparing the channel characteristic to the threshold and an additional threshold, where the threshold and the additional threshold define a threshold range corresponding to a reference channel characteristic, and where disabling the one or more features of the memory device may be based at least in part on the channel characteristic failing to satisfy the threshold range.

Some examples of the method 600 and the apparatus described herein may further include operations, features, circuitry, logic, means, or instructions for writing the reference channel characteristic to non-volatile memory at the memory device, or a host device, or both and determining the threshold and the additional threshold defining the threshold range based at least in part on reading the reference channel characteristic from the non-volatile memory.

Some examples of the method 600 and the apparatus described herein may further include operations, features, circuitry, logic, means, or instructions for determining a plurality of reference channel characteristics for a host device and the memory device, where each reference channel characteristic of the plurality of reference channel characteristics corresponds to one or more respective operating parameters, writing the plurality of reference channel characteristics to non-volatile memory at the memory device, or the host device, or both, and comparing the channel characteristic to the threshold based at least in part on a reference channel characteristic of the plurality of reference channel characteristics, where the disabling may be based at least in part on the comparing.

Some examples of the method 600 and the apparatus described herein may further include operations, features, circuitry, logic, means, or instructions for determining a first temperature at which the first signal is transmitted, or a second temperature at which the second signal is received, or both and selecting the reference channel characteristic of the plurality of reference channel characteristics for comparing the channel characteristic to the threshold based at least in part on the first temperature, or the second temperature, or both.

Some examples of the method 600 and the apparatus described herein may further include operations, features, circuitry, logic, means, or instructions for detecting a modification to the memory device based at least in part on the channel characteristic failing to satisfy the threshold, where disabling the one or more features of the memory device may be based at least in part on detecting the modification to the memory device.

In some examples of the method 600 and the apparatus described herein, the modification to the memory device includes adding an interposer to the memory device, adding cabling to the memory device, adding a socket to the memory device, or removing a DRAM component from the memory device, or any combination thereof.

Some examples of the method 600 and the apparatus described herein may further include operations, features, circuitry, logic, means, or instructions for monitoring a health of the memory device, where transmitting the first signal and determining the channel characteristic may be based at least in part on monitoring the health of the memory device.

Some examples of the method 600 and the apparatus described herein may further include operations, features, circuitry, logic, means, or instructions for performing a procedure for booting up the memory device, where transmitting the first signal and determining the channel characteristic may be based at least in part on performing the procedure for booting up the memory device.

Some examples of the method 600 and the apparatus described herein may further include operations, features, circuitry, logic, means, or instructions for stopping the procedure for booting up the memory device based at least in part on the channel characteristic failing to satisfy the threshold and refraining from communicating secure information with the memory device based at least in part on stopping the procedure for booting up the memory device.

Some examples of the method 600 and the apparatus described herein may further include operations, features, circuitry, logic, means, or instructions for using a first security key to perform a first portion of the procedure for booting up the memory device, where transmitting the first signal to the memory device may be based at least in part on using the first security key, and refraining from using a second security key associated with a second portion of the procedure for booting up the memory device based at least in part on the channel characteristic failing to satisfy the threshold, where disabling the one or more features of the memory device may be based at least in part on failing to complete the second portion of the procedure for booting up the memory device.

Some examples of the method 600 and the apparatus described herein may further include operations, features, circuitry, logic, means, or instructions for transmitting a signal indicative of a notification to an OEM, or a user device, or any combination thereof based at least in part on the channel characteristic failing to satisfy the threshold.

Some examples of the method 600 and the apparatus described herein may further include operations, features, circuitry, logic, means, or instructions for transmitting a third signal indicative of a command to the memory device and initiating a locking of a feature of the memory device based at least in part on the command, where the disabling may be based at least in part on initiating the locking of the feature.

Some examples of the method 600 and the apparatus described herein may further include operations, features, circuitry, logic, means, or instructions for selecting at least one of a frequency, an amplitude, or a voltage, or any combination thereof for the first signal, where transmitting the first signal may be based at least in part on the selecting.

In some examples of the method 600 and the apparatus described herein, the channel characteristic includes a channel impedance between a host device transmitting the first signal and the memory device.

In some examples of the method 600 and the apparatus described herein, the channel characteristic includes at least one of an amplitude for the second signal, a phase for the second signal, a slew rate for the second signal, or a duty cycle for the second signal, or any combination thereof.

In some examples of the method 600 and the apparatus described herein, the first signal may be transmitted using a data clock pin and the second signal may be received using a data pin.

In some examples of the method 600 and the apparatus described herein, a host device transmitting the first signal and the memory device may be both associated with a vehicle.

Figure 7:
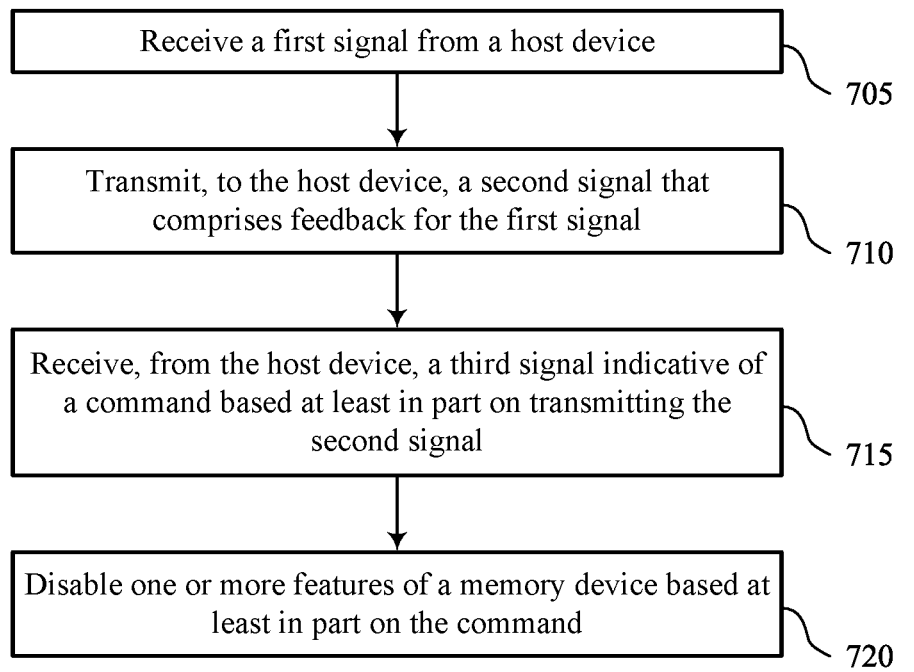

FIG. 7 shows a flowchart illustrating a method 700 that supports measuring change in a channel characteristic to detect a memory device attack in accordance with examples as disclosed herein. The operations of method 700 may be implemented by a memory device or its components as described herein. For example, the operations of method 700 may be performed by a memory device as described with reference to FIGS. 1 through 3 and 5. In some examples, a memory device may execute a set of instructions to control the functional elements of the device to perform the described functions. Additionally or alternatively, the memory device may perform aspects of the described functions using special-purpose hardware.

At 705, the method may include receiving a first signal from a host device. The operations of 705 may be performed in accordance with examples as described with reference to FIGS. 2 and 3. In some examples, aspects of the operations of 705 may be performed by a test signal component 525 as described with reference to FIG. 5.

At 710, the method may include transmitting, to the host device, a second signal that includes feedback for the first signal. The operations of 710 may be performed in accordance with examples as described with reference to FIGS. 2 and 3. In some examples, aspects of the operations of 710 may be performed by a feedback signal component 530 as described with reference to FIG. 5.

At 715, the method may include receiving, from the host device, a third signal indicative of a command based at least in part on transmitting the second signal. The operations of 715 may be performed in accordance with examples as described with reference to FIGS. 2 and 3. In some examples, aspects of the operations of 715 may be performed by a disabling command component 535 as described with reference to FIG. 5.

At 720, the method may include disabling one or more features of a memory device based at least in part on the command. The operations of 720 may be performed in accordance with examples as described with reference to FIGS. 2 and 3. In some examples, aspects of the operations of 720 may be performed by a disabling feature component 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving a first signal from a host device, transmitting, to the host device, a second signal that includes feedback for the first signal, receiving, from the host device, a third signal indicative of a command based at least in part on transmitting the second signal, and disabling one or more features of a memory device based at least in part on the command.

Some examples of the method 700 and the apparatus described herein may further include operations, features, circuitry, logic, means, or instructions for entering a power on state, where the first signal may be received while operating in the power on state, and operating according to a first mode supporting a feedback procedure for the first signal based at least in part on entering the power on state, where transmitting the second signal may be based at least in part on operating according to the first mode supporting the feedback procedure.

Some examples of the method 700 and the apparatus described herein may further include operations, features, circuitry, logic, means, or instructions for transmitting a signal indicative of a reference channel characteristic to the host device, where the third signal indicative of the command may be received further based at least in part on the reference channel characteristic.

Some examples of the method 700 and the apparatus described herein may further include operations, features, circuitry, logic, means, or instructions for writing a plurality of reference channel characteristics to non-volatile memory, where the signal indicative of the reference channel characteristic may be transmitted based at least in part on the plurality of reference channel characteristics.

In some examples of the method 700 and the apparatus described herein, the plurality of reference channel characteristics may be written to the non-volatile memory separate from a DRAM component of the memory device.

In some examples of the method 700 and the apparatus described herein, the first signal may be received using a data clock pin and the second signal may be transmitted using a data pin.

In some examples of the method 700 and the apparatus described herein, the host device and the memory device may be both associated with a vehicle.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, digital subscriber line (DSL), or technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a host device, comprising:
   transmitting a first signal to a memory device via a channel between the host device and the memory device;
   receiving, from the memory device, a second signal that comprises feedback for the first signal;
   determining, by the host device, a channel characteristic based at least in part on the second signal from the memory device, wherein the channel characteristic is indicative of an attack on the memory device based at least in part on a change associated with the channel;
   comparing the channel characteristic to a threshold and an additional threshold, wherein the threshold and the additional threshold define a threshold range corresponding to a reference channel characteristic; and
   disabling, by the host device, one or more features of the memory device based at least in part on the channel characteristic failing to satisfy the threshold range.

2. The method of claim 1, further comprising:
   writing the reference channel characteristic to non-volatile memory at the memory device, or a host device, or both; and
   determining the threshold and the additional threshold defining the threshold range based at least in part on reading the reference channel characteristic from the non-volatile memory.

3. The method of claim 1, further comprising:
   determining a plurality of reference channel characteristics for a host device and the memory device, wherein each reference channel characteristic of the plurality corresponds to one or more respective operating parameters;
   writing the plurality of reference channel characteristics to non-volatile memory at the memory device, or the host device, or both; and comparing the channel characteristic to the threshold based at least in part on a reference channel characteristic of the plurality, wherein the disabling is based at least in part on the comparing.

4. The method of claim 3, further comprising:
determining a first temperature at which the first signal is transmitted, or a second temperature at which the second signal is received, or both; and
selecting the reference channel characteristic of the plurality for comparing the channel characteristic to the threshold based at least in part on the first temperature, or the second temperature, or both.

5. The method of claim 1, further comprising:
detecting a modification to the memory device based at least in part on the channel characteristic failing to satisfy the threshold, wherein disabling the one or more features of the memory device is based at least in part on detecting the modification to the memory device.

6. The method of claim 5, wherein the modification to the memory device comprises adding an interposer to the memory device, adding cabling to the memory device, adding a socket to the memory device, or removing a dynamic random-access memory (DRAM) component from the memory device, or any combination thereof.

7. The method of claim 1, further comprising:
monitoring a health of the memory device, wherein transmitting the first signal and determining the channel characteristic are based at least in part on monitoring the health of the memory device.

8. The method of claim 1, further comprising:
performing a procedure for booting up the memory device, wherein transmitting the first signal and determining the channel characteristic are based at least in part on performing the procedure for booting up the memory device.

9. The method of claim 8, further comprising:
stopping the procedure for booting up the memory device based at least in part on the channel characteristic failing to satisfy the threshold; and
refraining from communicating secure information with the memory device based at least in part on stopping the procedure for booting up the memory device.

10. The method of claim 8, further comprising:
using a first security key to perform a first portion of the procedure for booting up the memory device, wherein transmitting the first signal to the memory device is based at least in part on using the first security key; and
refraining from using a second security key associated with a second portion of the procedure for booting up the memory device based at least in part on the channel characteristic failing to satisfy the threshold, wherein disabling the one or more features of the memory device is based at least in part on failing to complete the second portion of the procedure for booting up the memory device.

11. The method of claim 1, further comprising:
transmitting a signal indicative of a notification to an original equipment manufacturer (OEM), or a user device, or any combination thereof based at least in part on the channel characteristic failing to satisfy the threshold.

12. The method of claim 1, further comprising:
transmitting a third signal indicative of a command to the memory device; and
initiating a locking of a feature of the memory device based at least in part on the command, wherein the disabling is based at least in part on initiating the locking of the feature.

13. The method of claim 1, further comprising:
selecting at least one of a frequency, an amplitude, or a voltage, or any combination thereof for the first signal, wherein transmitting the first signal is based at least in part on the selecting.

14. The method of claim 1, wherein the channel characteristic comprises a channel impedance between a host device transmitting the first signal and the memory device.

15. The method of claim 1, wherein the channel characteristic comprises at least one of an amplitude for the second signal, a phase for the second signal, a slew rate for the second signal, or a duty cycle for the second signal, or any combination thereof.

16. The method of claim 1, wherein:
the first signal is transmitted using a data clock pin; and
the second signal is received using a data pin.

17. The method of claim 1, wherein a host device transmitting the first signal and the memory device are both associated with a vehicle.

18. A method, comprising:
receiving a first signal from a host device via a channel between the host device and a memory device;
transmitting, to the host device, a second signal that comprises feedback for the first signal;
receiving, from the host device, a third signal indicative of a command to disable one or more features of a memory device based at least in part on a change associated with the channel, the change associated with a channel characteristic and indicative of an attack on the memory device; and
disabling the one or more features of the memory device based at least in part on the command, wherein the command is based at least in part on the channel characteristic failing to satisfy a threshold range defined by a threshold and an additional threshold, the threshold range corresponding to a reference channel characteristic.

19. The method of claim 18, further comprising:
entering a power on state, wherein the first signal is received while operating in the power on state; and
operating according to a first mode supporting a feedback procedure for the first signal based at least in part on entering the power on state, wherein transmitting the second signal is based at least in part on operating according to the first mode supporting the feedback procedure.

20. The method of claim 18, further comprising:
transmitting a signal indicative of a reference channel characteristic to the host device, wherein the third signal indicative of the command is received further based at least in part on the reference channel characteristic.

21. The method of claim 20, further comprising:
writing a plurality of reference channel characteristics to non-volatile memory, wherein the signal indicative of the reference channel characteristic is transmitted based at least in part on the plurality of reference channel characteristics.

22. The method of claim 21, wherein the plurality of reference channel characteristics is written to the non-volatile memory separate from a dynamic random-access memory (DRAM) component of the memory device.

23. The method of claim 18, wherein:
the first signal is received using a data clock pin; and
the second signal is transmitted using a data pin.

24. The method of claim 18, wherein the host device and the memory device are both associated with a vehicle.

25. A host system, comprising:
one or more host devices; and
logic coupled with the one or more host devices and operable to cause the host system to:
  transmit a first signal to a memory device via a channel between a host device of the one or more host devices and the memory device;
  receive, from the memory device, a second signal that comprises feedback for the first signal;
  determine, by the host device of the one or more host devices, a channel characteristic based at least in part on the second signal from the memory device, wherein the channel characteristic is indicative of an attack on the memory device based at least in part on a change associated with the channel;
  compare the channel characteristic to a threshold and an additional threshold, wherein the threshold and the additional threshold define a threshold range corresponding to a reference channel characteristic; and
  disable, by the host device, one or more features of the memory device based at least in part on the channel characteristic failing to satisfy the threshold range.

26. The host system of claim 25, wherein the logic is further operable to cause the host system to:
  determine a plurality of reference channel characteristics for the host device and the memory device, wherein each reference channel characteristic of the plurality corresponds to one or more respective operating parameters;
  write the plurality of reference channel characteristics to non-volatile memory at the memory device, or the host device, or both; and
  compare the channel characteristic to the threshold based at least in part on a reference channel characteristic of the plurality, wherein the disabling is based at least in part on the comparing.

27. The host system of claim 25, wherein the logic is further operable to cause the host system to:
  detect a modification to the memory device based at least in part on the channel characteristic failing to satisfy the threshold, wherein disabling the one or more features of the memory device is based at least in part on detecting the modification to the memory device.

28. A memory system, comprising:
one or more memory devices; and
logic coupled with the one or more memory devices and operable to cause the memory system to:
  receive a first signal from a host device via a channel between the host device and a memory device of the one or more memory devices;
  transmit, to the host device, a second signal that comprises feedback for the first signal;
  receive, from the host device, a third signal indicative of a command to disable one or more features of the memory device of the one or more memory devices based at least in part on a change associated with the channel, the change associated with a channel characteristic and indicative of an attack on the memory device; and
  disable the one or more features of the memory device based at least in part on the command, wherein the command is based at least in part on the channel characteristic failing to satisfy a threshold range defined by a threshold and an additional threshold, the threshold range corresponding to a reference channel characteristic.

29. The memory system of claim 28, wherein the logic is further operable to cause the memory system to:
  enter a power on state, wherein the first signal is received while operating in the power on state; and
  operate according to a first mode supporting a feedback procedure for the first signal based at least in part on entering the power on state, wherein transmitting the second signal is based at least in part on operating according to the first mode supporting the feedback procedure.

30. A non-transitory computer-readable medium comprising instructions which, when executed by one or more processors of a host device, cause the host device to:
  transmit a first signal to a memory device via a channel between the host device and the memory device;
  receive, from the memory device, a second signal that comprises feedback for the first signal;
  determine, by the host device, a channel characteristic based at least in part on the second signal from the memory device, wherein the channel characteristic is indicative of an attack on the memory device based at least in part on a change associated with the channel;
  compare the channel characteristic to a threshold and an additional threshold, wherein the threshold and the additional threshold define a threshold range corresponding to a reference channel characteristic; and
  disable, by the host device, one or more features of the memory device based at least in part on the channel characteristic failing to satisfy the threshold range.

* * * * *